Patented Feb. 6, 1934

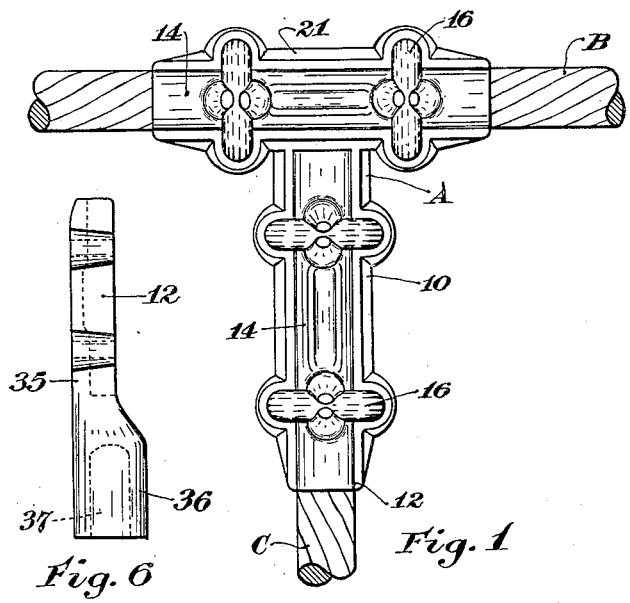
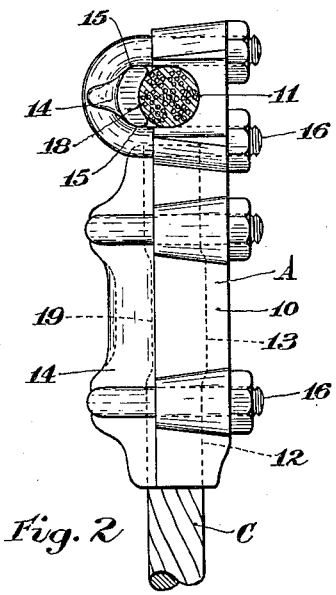
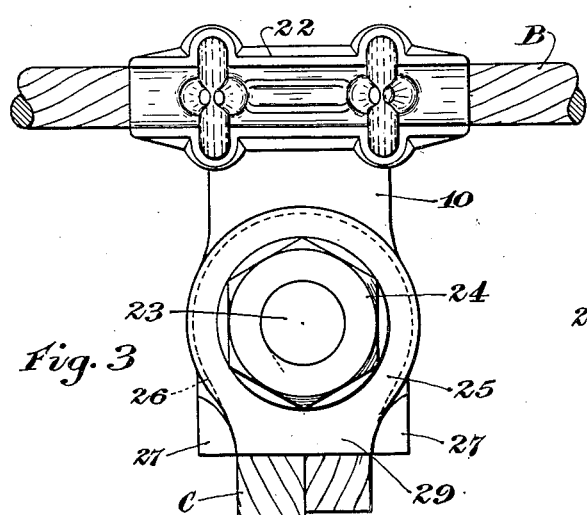
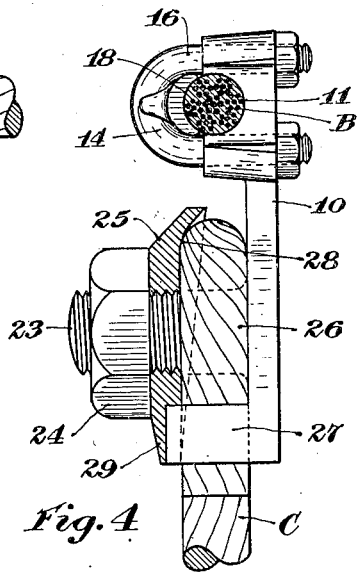
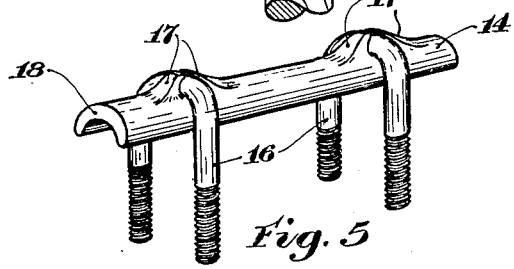

1,945,575

UNITED STATES PATENT OFFICE

1,945,575

CABLE CONTACTOR AND SUPPORT

John E. Sumpter, Minneapolis, Minn., assignor to Delta-Star Electric Company, Chicago, Ill., a corporation of Illinois Application December 22, 1926, Serial No. 156,347
Renewed November 12, 1931

3 Claims. (Cl. 173—273)

My invention relates to an improvement in cable contactor and support wherein it is designed to provide a simple but very effective clamping member which may be used for making electrical contacts with cables.

A feature of the invention resides in a plate clamping member wherein the plate is adapted to carry as a unit the bolt members which are held secured to the plate against disengagement therefrom, and in a manner to hold the parts collectively together so that they may be easily attached or disengaged in making a contact with the same.

It is also a feature of the invention to provide a cable attaching means wherein a particularly simple support is provided so as to connect intersecting cables, thereby providing a simple back member of a practically T-shaped construction and having cable grooves extending transversely to each other in a manner so as to connect the cables together to provide an electrical contact or joint with a very low loss without the necessity of soldering the joints and firmly securing the cables together. The body or back of my support is adapted to be formed of a material which is readily conductive of electrical current and the clamping plate is also of a similar material so that when the electrical cable, which is of copper or other electric conductive material, is clamped in my support it is apparent that the contact is very efficient.

A feature of my invention resides in a clamp unit having the clamp bolts connected together in a manner to be inseparable from the plate unit, yet being free to permit the plate to adjust itself to the cable and to adjust itself in relation to the clamping bolts which support the same. These features together with the feature of a plate which is adjustable to different size cables provides a cable contactor and support of a very desirable nature.

My cable support provides means for holding cables for various purposes wherein it is designed to connect two cables together extending in different directions so as to support the same rigidly connected and in a very strong and substantial manner. In this respect my support may be used as a strain connector for cables.

These features together with other details and objects of my invention will be more fully and clearly set forth in the specification and claims.

In the drawing forming part of this specification:

Figure 1 is a front view of my cable contactor and support as it would appear in use.

Figure 2 is a side view of the same, showing the horizontal cable in cross section.

Figure 3 is a front view of a variation of my cable support.

Figure 4 is a side elevation of the same, partly illustrated in cross section.

Figure 5 is a perspective view of the plate unit.

Figure 6 is a side view of a different form of my contactor and support having the clamping plate removed therefrom.

My cable contactor and support A is designed to hold transversely extending cables B and C. These cables may extend approximately at right angles to each other or in any angular relation and the support is adapted to ordinarily engage the end of the cable C.

Th contactor and support A is formed with a base or body portion 10 having cable grooves 11 and 12 formed therein for receiving the cables B and C, respectively. These grooves 11 and 12 permit the cables to lie embedded in the body plate 10 and the grooves may be formed with a depression 13 or an offset portion, as illustrated in dotted outline in Figure 2, so that the cable may be clamped more firmly and rigidly in the contactor and support.

I provide a unit clamping plate member 14 which is adapted to adjustably fit over the grooves 11 and 12, respectively, so that the longitudinal side edges 15 of this plate member are attached and fit within the grooves 11 or 12 so that the unit clamping plate 14 may be drawn tight against the cable in the respective groove of the support A. This permits the use of my unit clamping plate in a manner to adjust itself to different size cables, yet providing a very substantial contact with a long bearing surface engaging against the cable.

The unit clamping plate 14 is provided with a pair of bolt members 16 which are held by the ears 17 formed integral with the body of the plate 14 and projecting upward and over the bolt members 16 in a manner to engage over the bolt members beyond the diametric center portion thereof so as to lock the bolt members against disengagement from the plate 14, thereby providing the unit clamping member 14.

The clamping member or clamp plate 14 comprises a piece of metal which is rigid against bending, and the ears or lugs 17 are of triangular shape with their thickest parts at the base and with their apices thinned so that they may be easily battered over the U-bolt. The apices of these lugs 17 are battered over the bolt only a relatively short distance, not substantially more than half the diameter of the U-bolt, so that the ears or lugs 17 all lie in the same line along the length of the clamp plate 14. The thickening of the bases of the lugs is permissible because the clamp plate is rigid and it is not necessary to avoid interference with any flexibility in this plate. The rigidity of the clamp plate assures proper clamping of the conductor to the base of the connector over the entire area of contact and avoids any tendency of the battered over apices of the lugs 17 to open which might occur if the plate were flexible and bent into biting engagement at its ends with the element clamped thereby. Furthermore, the base A and, where this base has an extension, the extension, too, have a conductivity at least equal to that of the cable or conductor to be clamped for connecting two conductors together through the conductivity of the base of the clamp. The shape of the lugs 17 permit forming the clamp plate 14, with its bottom groove or concavity, in a mold which may be parted in a direction generally normal to the base of the clamp plate.

The sides 15 of the clamping member 14 extend in close proximity to the sides of the bolt members 16, while the ears 17 engage the bolts loosely enough to permit the plate 14 to adjust itself with the cable which it is engaging. This provides a unit clamping member with the bolts 16 adjustably connected to the plate 14 and held against disengagement from the same so that a very desirable clamping plate is provided. In attaching a plate of this kind it is easy for the workmen to connect the plate by means of the bolts 16 to the base portion 10 so that by means of suitable nuts which engage the bolts 16 the plate 14 is drawn very tightly against the cables B or C. The channel 18 formed on the inner surface of the plate 14 is offset at 19 to press the cable into the recess 13. The longitudinal channel 18 of the plate 14 provides a contacting surface for the cable of a long nature adapted to press a long portion of the cable in contact with the base 10 and I have found that my contactor and support A provides a very practical electrical connection for large electric copper cables.

In having the unit clamping plate 14 held collectively it is much easier for the workmen to make attachment of cables and connections. Many times these connections must be made on the line poles and in other places where it is not convenient to have the parts all separated, and thus the collective clamping unit 14 will be clearly apparent as an important feature of my invention.

In Figures 3 and 4, I have illustrated another form of my contact and support for cables wherein the base plate 10 is provided with a head portion 22 which is similar to the head portion 21 of the contactor and support A, illustrated in Figures 1 and 2. This head portion 22 is adapted to receive the cable B which is held securely by the unit plate or clamping means 14. The plate 10 in this support is provided with a stud screw 23 which is formed integral with the back plate 10 and which is threaded in a manner to receive the nut 24 to hold the washer clamping plate 25 clamped firmly against the loop 26 formed on the cable C. The stud screw 23 forms a stem around which the loop 26 is formed and I provide a pair of lugs 27 on either side of the stud 23 which form guides between which the cable C is adapted to be formed so as to securely lock the cable about the screw 23.

In Figure 6, I have illustrated a base plate member 35 which is similar to the base plate 10 in that it has one cable groove 12 extending in the same. This contactor and support for cables is provided with a round or cylindrical end 36 which is formed with a socket 37 into which the end of a cable may be clamped by soldering the same therein. The plate 35 is adapted to operate with one of the clamping plates or units 14 to clamp a cable in the cable groove 12.

The washer plate 25 is concaved on the inside at 28 and is formed with a forwardly extending lip 29 which extends between the lugs 27. This construction provides a means of holding a cable in a looped formation with the plate 25 engaging a large surface of the cable and pinching the same tightly about the stud screw 23 when the nut 24 is turned tight against the plate. In this manner I provide a cable contactor and support which may be used as an electric contacting contactor or as a strain coupling to connect cables in a very rigid and firm manner. For electrical purposes my cable contactor is very efficient and in this case is made of a material readily conductive of electric current, thereby providing a low loss contact for electric cables.

In accordance with the patent statutes I have described the principles of my cable contactor and support and I have endeavored to illustrate in the drawing the best embodiment thereof, but I desire to have it understood that the illustrations are only suggestive of a means of carrying out my invention and that the same may be applied to uses other than those above set forth and in such variation as would be readily apparent to one skilled in the art without departing from the spirit of my invention, within the scope of the following claims.

I claim:

1. In combination, a rigid metal base having a groove therein for receiving and clamping an electric conductor, said base having relatively great area of contact with the conductor along said groove and being of a section to provide a conductivity at least equal to that of the conductor to be clamped, a second conductor electrically connected to said first conductor through the conductivity of said base, a clamp plate substantially parallel with the base and comprising a rigid piece of metal having in one side a longitudinally extending groove for receiving and gripping the conductor and for clamping the conductor in the groove in said base over substantially the entire extent of the groove in said base, said groove having an offset intermediate its ends for securing a clamping action upon the conductor centrally between the ends of the plate and betterment of the conductivity between the conductor and said base, a pair of U-bolts straddling said plate from the opposite side, lugs integral with said opposite side of said plate and aligned lengthwise of the plate to receive said bolts, said lugs being of generally triangular shape with the bases thickened lengthwise of the plate and the apices thinned and battered over the bolts to secure said bolts to said plate, and nuts threaded on the legs of said bolts to clamp the conductor between the base and clamp plate and in said grooves.

2. In combination, a rigid metal T-shaped base having a head provided with a groove for receiving and gripping an electric conductor and a depending leg of a section to provide a conductivity at least equal to that of the conductor to be clamped for the purpose of connecting the conductor to said leg through said base, a clamp plate for clamping the conductor in the groove in the head of said base, said clamp plate comprising a rigid piece of metal having in one side a longitudinally extending groove for receiving and gripping the conductor, said groove having an offset intermediate its ends for securing a clamping action upon the conductor centrally between the ends of the plate and betterment of conductivity between the conductor and said base, a pair of U-bolts straddling said plate from the opposite side, and lugs integral with the opposite side of said plate and aligned lengthwise of the plate to receive said bolts, said lugs being of generally triangular shape with the bases thickened lengthwise of the plate and the apices thinned and battered over the bolts to secure said bolts to said plate, the head of said base having apertured ears for receiving the legs of said bolts, and nuts threaded on the legs of said bolts to clamp the conductor between the head of the base and the clamp plate and in said grooves.

3. In combination, a rigid metal base having a groove therein for receiving and gripping an electric conductor, said base having relatively great area of contact with the conductor along said groove and being of a section to provide a conductivity at least equal to that of the conductor to be clamped, a second conductor electrically connected to said first conductor through the conductivity of said base, a clamp plate substantially parallel with the base and comprising a rigid piece of metal having in one side a longitudinally extending groove for receiving and gripping the conductor and for clamping the conductor in the groove in said base over substantially the entire extent of the groove in said base, a U-bolt straddling said clamp plate from the opposite side, a pair of lugs integral with said opposite side of said plate and aligned lengthwise of the plate to receive said bolt, said lugs being of generally triangular shape with the bases thickened lengthwise of the plate and the apices thinned and battered over the bolt to secure said bolt to said plate, and nuts threaded on the legs of said bolt to clamp the conductor between the base and clamp plate and in said grooves.

JOHN E. SUMPTER.